United States Patent [19]

Parulski et al.

[11] Patent Number: 5,241,659
[45] Date of Patent: Aug. 31, 1993

[54] AUXILIARY REMOVABLE MEMORY FOR STORING IMAGE PARAMETER DATA

[75] Inventors: Kenneth A. Parulski, Rochester; Donald E. O'Brien, Holcomb; David L. Funston, Batavia, all of N.Y.

[73] Assignee: Eastman Kodak Company, Rochester, N.Y.

[21] Appl. No.: 582,727

[22] Filed: Sep. 14, 1990

[51] Int. Cl.⁵ .................. G06F 15/20; G09G 1/28; H04N 9/79; G11B 5/02
[52] U.S. Cl. .................. 395/164; 340/701; 340/799; 358/310; 358/335; 360/19.1; 369/32
[58] Field of Search .................. 395/164–166; 358/310, 322, 335, 342, 312; 360/10.1, 19.1; 340/701, 703, 799; 369/32

[56] References Cited

U.S. PATENT DOCUMENTS

| | | | |
|---|---|---|---|
| 4,305,094 | 12/1981 | Yamada | 358/80 |
| 4,430,675 | 2/1984 | Fujime | 358/342 |
| 4,652,939 | 3/1987 | Baumeister | 358/342 |
| 4,675,755 | 6/1987 | Baumeister et al. | 360/35.1 |
| 4,680,647 | 7/1987 | Moriyama | 358/342 |
| 4,717,971 | 1/1988 | Sawyer | 358/342 |
| 4,769,721 | 9/1988 | Kajiura | 360/10.1 |
| 4,779,252 | 10/1988 | Custers et al. | 369/32 |
| 4,788,586 | 11/1988 | Zekenbrecht | 358/28 |
| 4,791,496 | 12/1988 | Kageyama et al. | 358/342 |
| 4,800,445 | 1/1989 | Kanada | 358/342 |
| 4,847,697 | 7/1989 | Tobe | 358/342 |
| 4,855,842 | 8/1989 | Hayes et al. | 358/342 |
| 4,872,151 | 10/1989 | Smith | 369/14 |
| 4,922,437 | 5/1990 | Sakata et al. | 364/574 |
| 4,972,068 | 11/1990 | Ohtani et al. | 235/375 |
| 5,014,127 | 5/1991 | Richards | 358/310 |
| 5,063,547 | 11/1991 | Custers et al. | 369/32 |

OTHER PUBLICATIONS

The Electronic Still Camera A New Concept in Photography, IEEE Trans on Consumer Electronics; by: Kihara et al–Aug. 1982.

*Primary Examiner*—Dale M. Shaw
*Assistant Examiner*—Kee M. Tung
*Attorney, Agent, or Firm*—Edward Dugas

[57] ABSTRACT

The limited ability of an internal memory in a CD player to store user-generated image parameter data is augmented by a storage medium, such as an electrically programmable read only memory module, configured to be removably interfaced with the CD player's microcontroller for storing image parameter data that has been programmed by the user. The module can be then removed from the playback device and inserted into that or another playback device for controlling its operation. The customized image parameter data may include one or more image display parameters including contrast, image magnification, color balance, saturation, border type and border location. It may also store information from which a photofinisher may produce hard copy prints of selected images or an entirely new album disc of user selections taken from multiple discs.

84 Claims, 6 Drawing Sheets

AUXILIARY REMOVABLE MEMORY FOR STORING IMAGE PARAMETER DATA

FIELD OF THE INVENTION

The present invention relates in general to digitized image data processing systems and is particularly directed to the use of an auxiliary removable memory to store customized image parameter data for controlling the manner in which digitized images are played back from a playback apparatus' frame store and displayed on a user's television display.

BACKGROUND OF THE INVENTION

Co-pending application Ser. No. 582,305, filed Sep. 14, 1990, entitled "Multiresolution Digital Imagery Photofinishing System," by S. Kristy, assigned to the assignee of the present application and the disclosure of which is herein incorporated, describes a digital image processing system wherein photographic still images, such as those captured by way of a 35 mm camera, are digitized and recorded on a optical compact disc (CD), for subsequent playback on a CD player. The output of the CD player drives a reproduction device, such as a consumer television set or color thermal printer. One of the key aspects of that system is the manner in which the digitized images are compressed to obtain a storage file format that facilitates both the storage and retrieval of images for reproduction by a variety of devices the resolution of which may vary from device to device.

In particular, when a photographic image capture medium, such as a 24 or 36 frame, 35 mm film strip, is scanned by a high resolution scanner to digitize the respective images that have been captured on the film, each digitized image is subjected to a compression operator that 'down-converts' a very high resolution image file, (e.g., 2048 lines by 3072 pixels/line file) into an iterative set of residue image files and a base, or low, resolution file, (e.g. a 512 lines by 768 pixels per line array representative of the image). One example of a preferred compression operator is described in U.S. Pat. No. 4,969,204, issued Nov. 6, 1990, entitled "A Hybrid Residual-Based Hierarchical Storage and Display Method for High Resolution Digital Images in a Multi-use Environment," by Paul W. Melynchuck et al, assigned to the assignee of the present application and the disclosure of which is herein incorporated. As described in that Melynchuck et al application, each (512×768) base resolution file is formatted as a set of four interlaced (256 lines by 384 pixels per line) image sub-arrays, respectively defined by four sub-arrays of pixels within the 512×768 base resolution array, corresponding to odd pixel/odd line, odd pixel/even line, even pixel/odd line, even pixel/even line sub-arrays.

The size of both the base resolution file and its interlaced sub-fields are chosen to facilitate the implementation and incorporation of a low cost, reduced complexity frame store/data retrieval architecture into a conventional CD player, which provides for rapid call-up and display of selected images on a consumer television color monitor. Several preferred embodiments of such an architecture are described in co-pending patent application Ser. No. 583,265, filed Sep. 14, 1990, entitled: "Mechanism for Controlling Presentation of Displayed Image," by K. Parulski et al, and Ser. No. 809,365 filed Dec. 18, 1991, entitled: Storage and Retrieval of Digitized Photographic Images, by M. Axman et al, assigned to the assignee of the present application and the disclosures of which are herein incorporated.

As described in the above-referenced applications, each captured image is digitized by the scanner and stored 'as is', regardless of its orientation on the film. Annexed to each image file is a header file which contains orientation, aspect ratio and other minilab operator-generated information that is readable by the data retrieval microcontroller of a CD player, to control the interfacing of the base resolution data file from the compact disc to a reproduction device (e.g. TV display).

Now although an optical compact disc is a very high quality high density storage medium, it is a write-once or permanent medium; it cannot be erased or altered. Moreover, in order to provide a substantial degree of reproductive flexibility to the user, the contents of the image file and its associated header, as prepared by the photofinishing minilab operator, are defined to optimize predefined image characteristics (scene balance) and to indicate how the image has been captured and digitized, rather than tailor the stored image file for playback on a particular reproduction device. Further adjustment of parameters of the reproduced image is left to the user. Thus, where the reproduction device is a consumer television monitor, the customer/user may selectively customize the manner in which an image file is displayed by the operation of a player/display control unit (e.g. hand-held IR transmitter) which drives video display software resident in the player. Indeed, from a practical standpoint, it can be expected that in any given roll of film, there will be one or more pictures that a user may find less than interesting or may wish to modify (e.g. enlarge, crop) to a preferred presentation.

In audio playback systems, in order to accommodate the storage of preference settings for selected song files, some CD players may be equipped with an auxiliary internal memory through which a user may specify a list of favorite songs to be sequenced on playback, rather than having the player access all of the audio files in the order in which they have been recorded While such an auxiliary 'preferred sequence' feature would also be useful in an image playback device, its functionality is limited and the preference data itself is confined to that user's CD player. As a result, if the user wishes to display or otherwise reproduce a customized image or set of images on another player, the user will have to go through the repeat exercise of setting up the display parameters on that player.

Because a color image effectively consists of an extremely large set of parallel information sources, whereas the contents of a sound track are confined to one or two serially presented waveforms, the degree of freedom associated with the modification of a digital color image provides the user with practically an infinite number of possible alternative appearances for the base image file, so that customization of even a single image may involve both creativity and the expenditure of a non-insubstantial period of time. Thus, it can be expected that the user will want to save these parameters not only for future display of a customized image on the very TV monitor that has been used to customize one or more images stored on the disc, but for future playback on another CD player, for example, that belonging to a relative or neighbor. As mentioned previously, however, the data base on which the digitized image has been stored is unalterable, so that image customization data cannot simply be appended to the associated image file on the optical compact disc.

In addition to the problem of customized data confinement, the CD player resident memory has a finite storage capacity. As a consequence, regardless of the fact that it permits the user to store customized parameter data, eventually, the CD player's auxiliary internal memory will run out of display parameter storage space.

SUMMARY OF THE INVENTION

In accordance with the present invention the limited ability of an internal memory in an optical compact disc player to store user-generated image parameter data is augmented by providing a storage medium, such as an electrically programmable read only memory module, that is configured to be removably interfaced with a CD player's microcontroller for storing image parameter data that has been (remotely) programmed by the user. More particularly, the present invention is directed to a digitized image playback apparatus for use with a digital image processing system wherein a plurality of photographic images that have been captured on a photographic recording medium, such as a 35 mm film strip, are digitized and written to an optical compact disc by way of a photoprocessing minilab workstation. The compact disc is then supplied to the customer for playback on a CD player and display on the customer's home television set. The CD player's microcontroller reads the contents of a digitized image file and outputs image display control signals for controlling how an accessed image is displayed.

For this purpose, in addition to the digitized image itself, the disc contains orientation and aspect ratio information that has been placed on the disc by the minilab operator to define what type of image has been recorded, so that a digitized image file may be properly accessed from the disc and presented to the display device in an 'upright' orientation, with the correct aspect ratio.

The microcontroller is also adapted to be interfaced with a second, transportable digital data storage medium, such as a 'smart card' or magnetic memory cartridge, which is removably insertable into the playback device and the contents of which are readable by and alterable by the microcontroller. This auxiliary, removable memory module permits the user to save customized image parameter data that the user has input to the microcontroller (as by way of a user interface, such as a hand-held remote control unit). The cartridge can be then removed from the playback device and inserted into that or another playback device for controlling its operation. The customized image parameter data may include one or more image display parameters including contrast, image magnification, color balance, saturation, border type and border location.

DETAILED DESCRIPTION

Before describing in detail the particular improved image parameter data auxiliary storage and retrieval mechanism in accordance with the present invention, it should be observed that the present invention resides primarily in a novel structural combination of conventional signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 1:
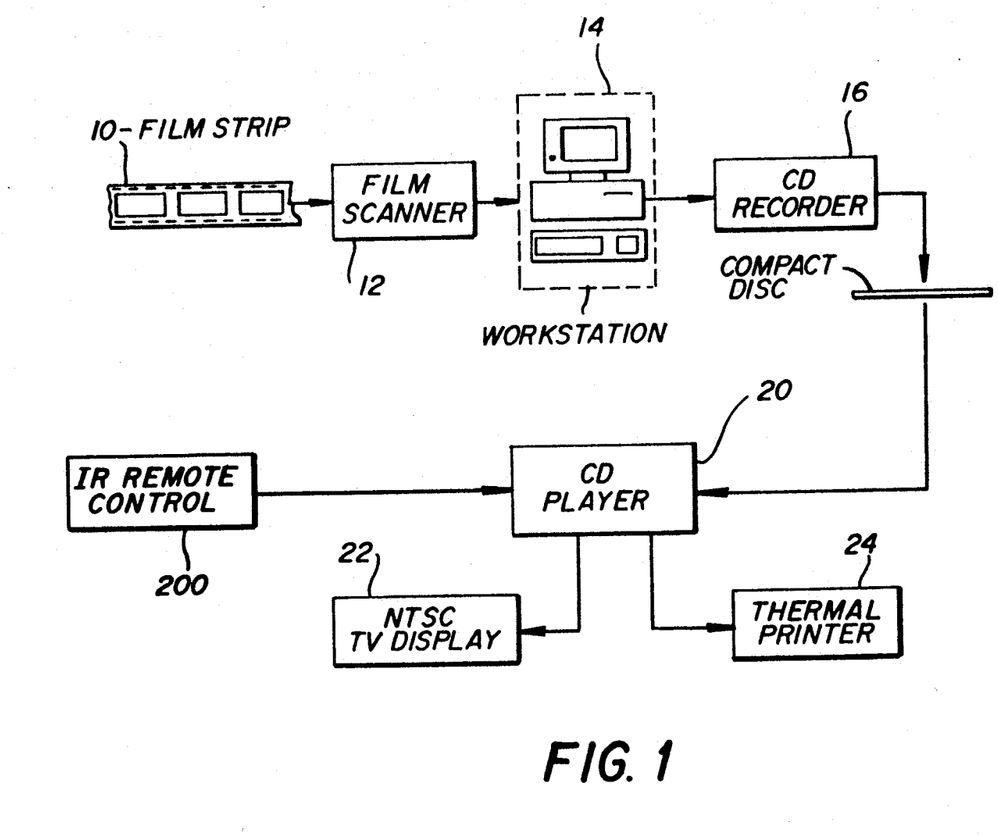
FIG. 1 diagrammatically illustrates a photographic color film processing system in which the present invention may be employed.

FIG. 1 diagrammatically illustrates a photographic color film processing system (photofinishing minilab) with which the present invention may be employed and for purposes of the present description such a system may be of the type described in the above-referenced Kristy application. It should be observed, however, that the system described in that application is merely an example of one type of system in which the invention may be used and is not to be considered limitative of the invention.

In accordance with the digital image processing system of FIG. 1, photographic images, such as a set of twenty-four or thirty-six 36 mm×24 mm image frames of a 35 mm film strip 10, are scanned by a high resolution opto-electronic film scanner 12, such as a commercially available Eikonix Model 1435 scanner. High resolution scanner 12 outputs digitally encoded data (e.g. a 3072×2048 pixel matrix) representative of the internal electronic scanning of a high resolution image sensing array onto which a respective photographic image frame of film strip 10 is projected. This digitally encoded data (digitized image) is coupled in the form of an imaging pixel array-representative bit map to an attendant image processing workstation 14, which contains a frame store and image processing application software through which the digitized image may be processed (e.g. enlarged, cropped, subjected to a scene balance correction, etc.) to achieve a desired image appearance. Once an image file has been prepared, it is stored on a transportable medium, such as a write-once optical compact disc, using compact disc recorder 16. The disc may then be inserted into a compact disc player 20 and, via the operation of selector switches of a cabinet-resident control panel or (IR) remote control unit 200, a selected image file is accessed for display on the user's television set 22. The CD player may also drive a high resolution thermal printer 24 for obtaining a hard copy of a selected image.

In accordance with the image processing system described in the above referenced Kristy application, each digitized high resolution image is stored as a respective image data file containing a low, (or base) resolution image bit map file, and a plurality of higher resolution residual image files associated with respectively increasing degrees of image resolution. By iteratively combining the higher resolution residual image file data with the low resolution image bit map file data, successively increased resolution images may be recovered from the base resolution image.

As an example, spatial data values representative of a high resolution (3072×2048) image scan of a 36 mm-by-24 mm image frame of a 35 mm film strip 10 may be stored as a respective image data file including a base resolution image bit map file containing data values associated with a spatial image array of 512 rows and 768 columns of pixels and an associated set of residual image files to be stored on the disc. Within the workstation itself, the base resolution image may be further sub-sampled to derive an even lower resolution sub-array of image values (e.g. on the order of 128×192 pixels) for display on a segment of the system operator's workstation for the purpose of identifying image orientation and specifying aspect ratio. Preferably, as described in the above-referenced Parulski et al application, a header file is associated with each digitized image for the purpose of specifying how the image was captured on film and has been correspondingly digitized and stored on disc. The information in the header file is used by the playback device to ensure that the image will have an upright orientation and the correct aspect ratio for the reproduction device. In addition, a master header file is recorded which includes a unique ID number for each disc recorded by CD recorder 16 in FIG. 1, in order to uniquely identify each disc.

When a film strip is originally scanned in the photoprocessing minilab, each picture is digitized as though it were horizontally oriented, irrespective of its actual orientation on the film. The digitized image is stored in the workstation's frame store, as is, and a lower resolution version of the digitized image is displayed on the display monitor of workstation 14, so that the image may be viewed by the operator. As each image is digitized and stored on the disc, the photofinishing minilab operator, using a workstation input device, enters a set of 'presentation' control codes that are incorporated within the header file associated with a respective image file to indicate how the image has been stored, so that, when subsequently accessed by a reproduction device, the image will be played back in an upright orientation at the correct aspect ratio.

Figure 2:
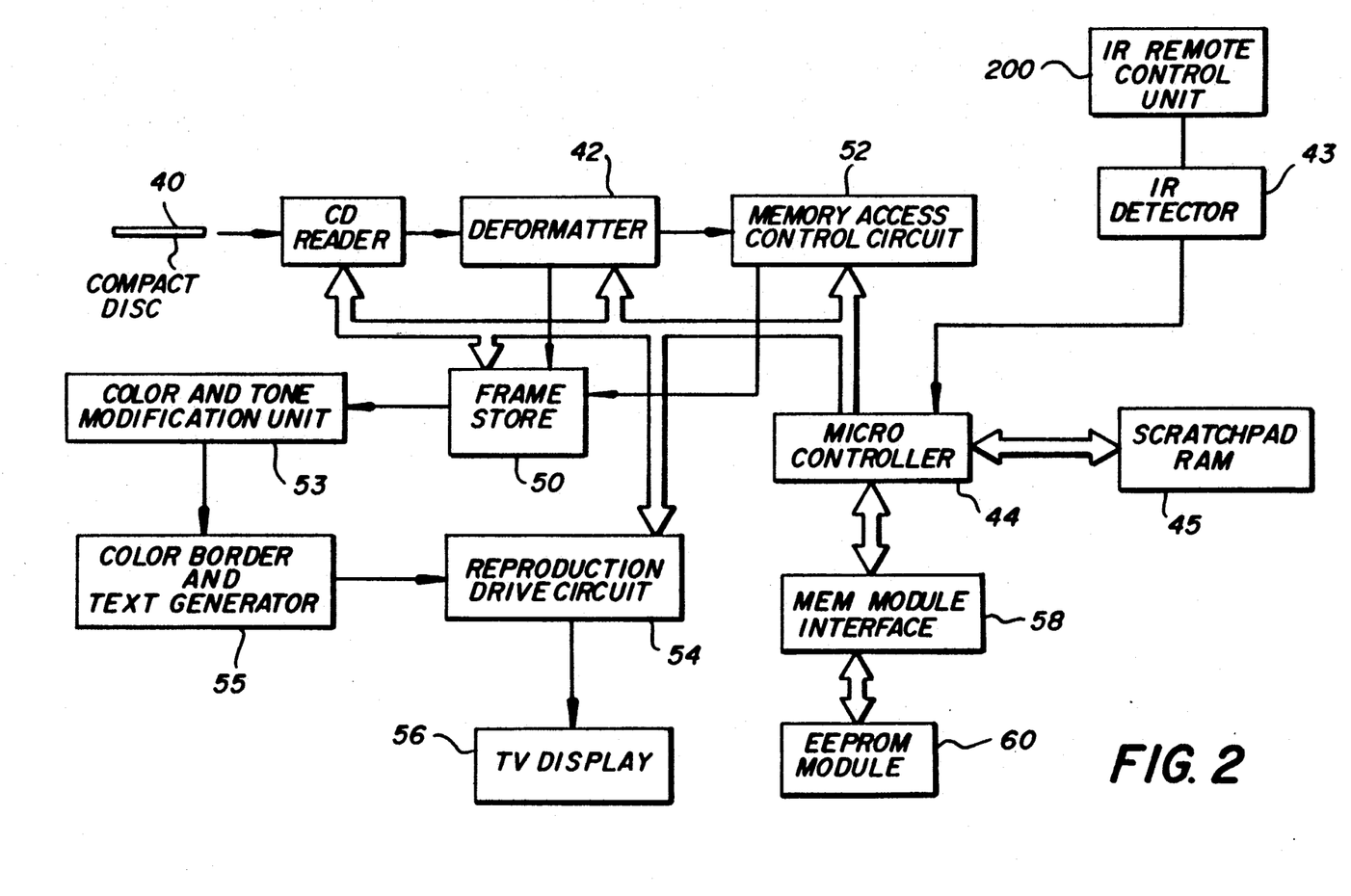
FIG. 2 diagrammatically illustrates the signal processing architecture of a digitized still photographic image playback apparatus that incorporates an auxiliary removable memory module for storing and retrieving user-customized image parameter data.

FIG. 2 diagrammatically illustrates the signal processing architecture of the image retrieval mechanism described in the above-referenced Parulski et al application, that has been modified in accordance with the present invention to incorporate an auxiliary removable memory module for storing user-customized image parameter data. As in the Parulski et al application, the playback device itself is preferably a commercially available compact optical disc player, which accesses digital image files that have been stored on disc and supplies video signals to a user's color television monitor. In accordance with the retrieval mechanism described in the Parulski et al application, the contents of the digital image data file read from an optical compact disc 40 are coupled to a deformatter 42, wherein the file is deformatted into a digitized image and its associated header field, under the control of a resident microcontroller 44. The digitized image is stored in a frame store 50, while the contents of the header field are coupled to a memory access control circuit 52, which controls how the digitized image data is transferred from the disc into frame store 50 and how the contents of the frame store are read out to associated circuitry 54 for driving a color television display 56.

Depending upon the size of frame store 50, the architecture of the memory access control circuitry may incorporate decimation/interpolation operators to adjust the aspect ratio and size of the image eventually supplied by the frame store to the television display. For a description of the details of the memory access control architecture attention may be directed to the previously referenced Parulski et al and Axman et al applications. In accordance with the improvement provided by the present invention, the user/viewer is able to supply and store customizing image reproduction parameters, independently of preprogrammed display control instructions, so that microcontroller 44 will control the presentation of image data to the display device in accordance with such user-preference inputs. For this purpose, microcontroller 44 is coupled with an interface 58 through which it may write to and read a removably engageable auxiliary memory module 60, such an electrically erasable programmable read only memory (EEPROM). The form module 60 takes may be any of a variety of currently available EEPROM modules, such as a 'smart card' or a magnetic ROM cartridge used in commercial video games and laptop computers. For an illustration of the use and manner of interfacing an EEPROM device, per se, as an auxiliary memory module for augmenting the internal storage capability of a playback device, attention may be directed to the Hayes et al, U.S. Pat. No. 4,855,842, which describes the interfacing of such a module for a programmed video teaching system and how such an auxiliary memory module can be used to permit access by one or more specific users (students) and keep track of a student's progress.

In accordance with the present invention, such an auxiliary, transportable, memory module is used for storing user-sourced image customizing parameters, such as contrast, image magnification, color balance, saturation, border type and border location, etc., thereby enabling the user to save, in a removable memory module, parameters that have been input to the microcontroller, as by way of a conventional, hand-held remote control (IR) unit 200. Removable memory module 60 may then be extracted from interface 58 in the playback device and reinserted into that device during a subsequent playback operation or inserted, along with its associated disc, in another playback device for controlling another reproduction unit.

In order to facilitate an understanding of the image customizing and auxiliary storage mechanism of the present invention, the following discussion will explain both the operation and the data structure used to assemble respective images and associated parameter fields that are defined in the course of customizing one or a plurality of images.

Figure 7:
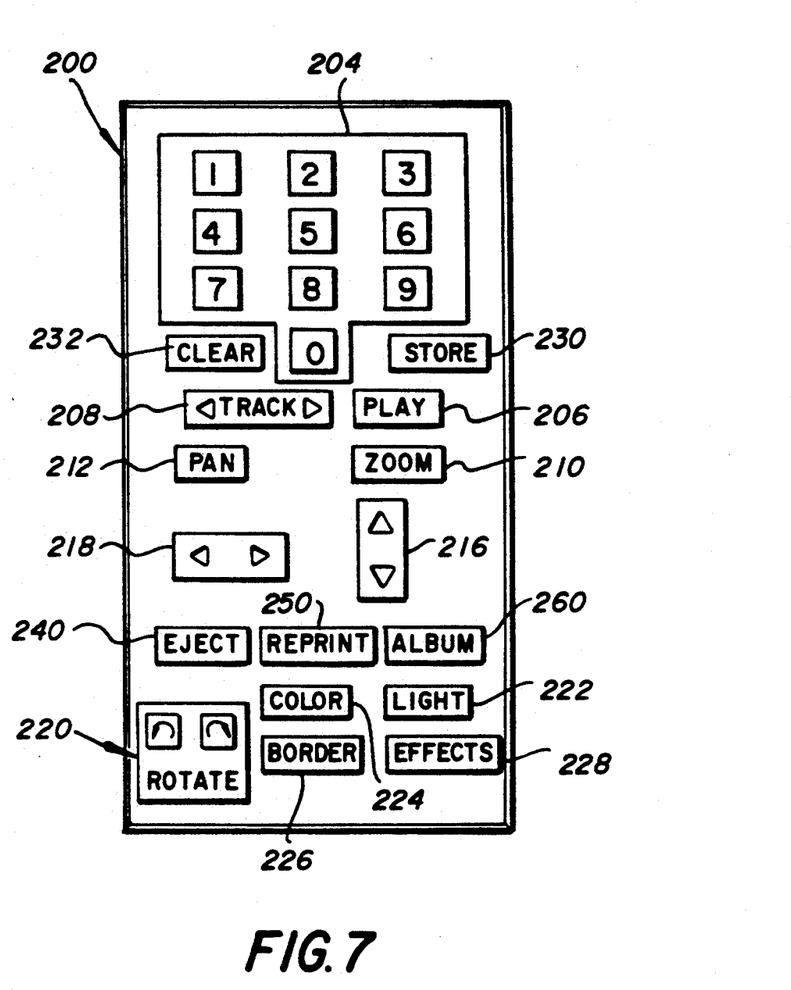
FIG. 7 shows the push-button layout configuration of a user-operated IR remote control unit for operating a CD player.

When an optical compact disc onto which digitized image files have been recorded is inserted into playback device 20 in FIG. 1, the presentation of images on NTSC display 22 can be controlled by the user via IR remote control unit 200, which is shown in greater detail in FIG. 7. Individual images can be viewed by entering the image number using buttons 204 and then pressing the play button 206, or by pressing either the track forward or track backwards arrows 208 to move on to the next or back to the previous image on the disc. As the image data is read from disc 40, the presentation control data described in the Parulski et al application is used to control the memory access control circuit 52, so that the correctly oriented image is read from framestore 50. However, should the orientation code in the presentation control data be in error, due for example to an operator erroneously programming the presentation control data for the particular image in the course of recording the image onto the disc via CD recorder 16 (FIG. 1), then the user may re-orient the image via rotate buttons 220.

The user may also zoom in or out to display only a portion of the image in enlarged form by pressing the zoom button 210 followed by either of the up/down arrow keys 216, which instructs the memory control circuit 52 to read out the proper portion of the image stored in framestore 50. Further, the user may alter the appearance of any displayed image by pressing the 'lighten' button 222 followed by either the up/down arrows 216, which cause the supply of control codes for increasing or decreasing the contrast of the image, respectively, or the left/right arrows 218, which increase or decrease the brightness of the image, respectively, by properly instructing the color and tone modification circuit 53 to alter the brightness or contrast of the digitized image as desired, via digital lookup tables.

The user may also alter the color of the displayed image. For this purpose, the user may depress color button 224, followed by either the up/down arrows 216, which cause the generation of control codes to increase or decrease the color saturation of the image, respectively. Similarly, the user may depress the left/right arrows 218, which alter the color balance of the image, respectively, by instructing the color and tone modification circuit 53 to alter the saturation or color balance of the digitized image by means of a digital 3×3 color correction matrix circuit (not shown).

The user may also create a colored border in the image via color border generator and text generator 55, by first pressing the border button 226 followed by the arrow keys 216 and 218 which allow the border to be properly positioned. The color of the border can be changed by pressing the color button 224 and the border button 226 simultaneously, and then pressing keys 216 to alter the color saturation, or keys 218 to alter the color hue.

Generation and positioning of the colored border may be accomplished by means of the border generator circuitry disclosed in co-pending U.S. patent application Ser. No. 405,816, filed Sep. 11, 1989, entitled "A DIGITAL CIRCUIT FOR CREATING AREA DEPENDENT SPECIAL EFFECTS" by K. A. Parulski, et al, which is assigned to the assignee of the present invention and the disclosure of which is herein incorporated.

Finally, via a color and tone modification circuit of the type described in the above-referenced Parulski et al '816 application for generating 'posterized' images, the user may also create special effects, by first depressing the effects button 228 followed by the arrow keys 216 and 218, which cycle through a number of available effects, including posterized, false-color, or "negative" images, until the user selects a pleasing effect for the current image. The ease with which the user may access the above-described features may be facilitated by judicious use of on-screen menu overlays supplied by text generator 55. Once an image has been 'customized' in the manner described above, it is very desirable for the user to be able to display the image in the future in exactly the same fashion, instead of having to repeat the customization procedure each time the image is to be replayed. Thus, it is advantageous to be able to store the data describing the parameters which indicate how the image has been altered, so that it can be recalled and used subsequently, when the user wishes to display the same image. Because the system of FIG. 1 uses a write-once optical disc, and because CD player 20 cannot record information onto the optical disc, it is not possible to store this data onto the compact disc 40 of FIG. 2.

Thus, some other method of storing the data is required. While a control data memory could be permanently housed within the CD player, it is preferable that the storage device, such as EEPROM module 60 in FIG. 2, be removable and insertable into one or more other playback units.

In accordance with the present invention, once the user has customized an image in the manner described previously, the store button 230 is depressed, which causes the parameters which define the manner in which the image has been altered to be temporarily stored in a scratchpad RAM 45. The user may then proceed to display, and optionally alter, any or all of the images on the disc, depressing the store button 230 once a preferred image display is obtained. After all viewing, altering, and storing of images on the disc has been completed, the eject button 240 is pressed, which causes the disc to be ejected from the CD player, and also causes data stored in scratchpad RAM 45 to be written into EEPROM memory 60. As a result, the next time the same disc is inserted into any player containing the EEPROM module 60 used during the programming session just described, the customized control data can be read out from EEPROM module 60 into the scratchpad RAM 45, in order to display the images in the order programmed earlier and with the same zoom position, color balance, etc.

The user may delete any of the programmed images by pressing the clear button 232, so that any new images may be customized by advancing to the desired image, optionally altering the appearance of the displayed image, and then pressing the store button 230. This new control data is again temporarily stored in scratchpad RAM 45 and then written to removable EEPROM module 60 when the disc is ejected, as described above.

Figure 3:
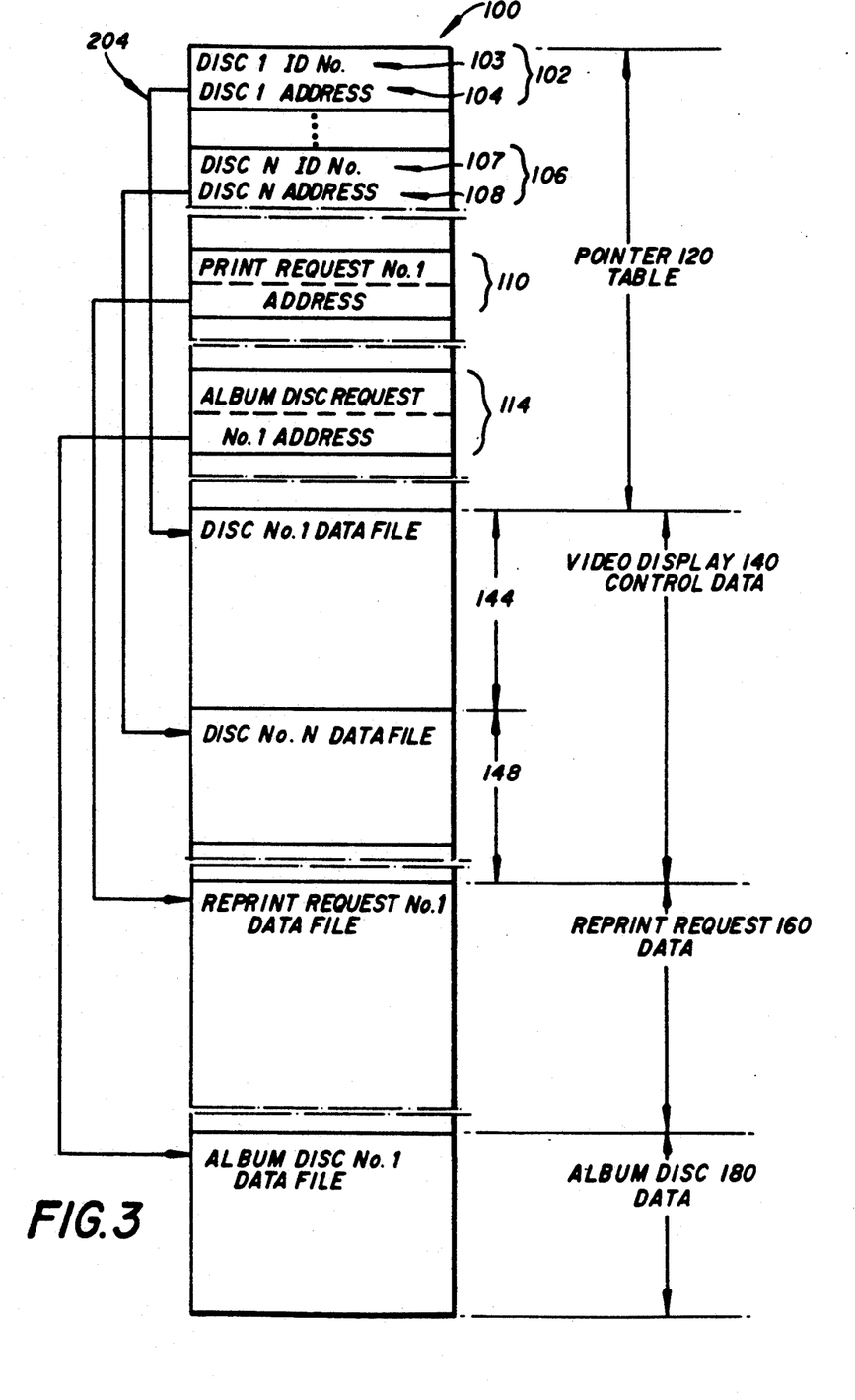
FIG. 3 illustrates the organization of the data stored in an EEPROM module for the storage of parameters which control image customization.

FIG. 3 illustrates the organization of the data stored in EEPROM module 60 for the storage of parameters which control image customization as described above. For purposes of providing an illustrative example, the memory organization of FIG. 3 assumes that EEPROM module 60 is a 64K Byte memory, which corresponds to a 16 bit address space. The 64K memory is divided into four separate sections, a pointer table section 120, a video display control data section 140, an optional reprint request data section 160, and an optional album disc data section 180. The lowest addresses are used to store a pointer table 120 which stores a multiplicity of pointer entries of three different types: disc identification (ID) pointer entries, such as disc #1 pointer entry 102 and disc #n pointer entry 106, print request pointer entries, such as print request pointer entry 110, and album disc request pointer entries, such as album disc request pointer 114.

The disc ID pointer entries, such as disc #1 pointer entry 102, are 6 Bytes in length and include 2 values, a 4 Byte disc ID number, such as disc #1 ID 103, followed by a 2 Byte address value, such as disc #1 address 104. Address 104 is the address within EEPROM address space 100 at which the data for the disc having an ID number matching the value stored in location 103 is stored. In other words, the address 104 "points" (as depicted by line 204) to the EEPROM memory location at which the control data for images with disc #1 ID 103 are stored. Similarly, address 108 is the address within EEPROM address space 100 at which the data for the disc #N having an ID number matching the value stored in location 107 is stored. The pointer table 120 contains disc ID pointer entries for all discs which have been previously inserted into playback device 20 and programmed in a manner to be described below.

When a disc is inserted into a CD player 20, the four Byte ID number programmed into the header of each disc is read from the disc 40 (FIG. 2) and the ID number is routed by deformatter 42 to microcontroller 44. Microcontroller 44 then searches the pointer table 120 to determine if any of the disc IDs, for example the IDs stored in location 103 or 107, match the ID number of the disc 40. If there is a match, for example with the ID value stored in location 107 of EEPROM address space 100, the corresponding video display control data, in this example disc #N data file 148, is read from EEPROM module 60 into scratchpad RAM 45 via memory module interface 58 and microcontroller 44.

Figure 4:
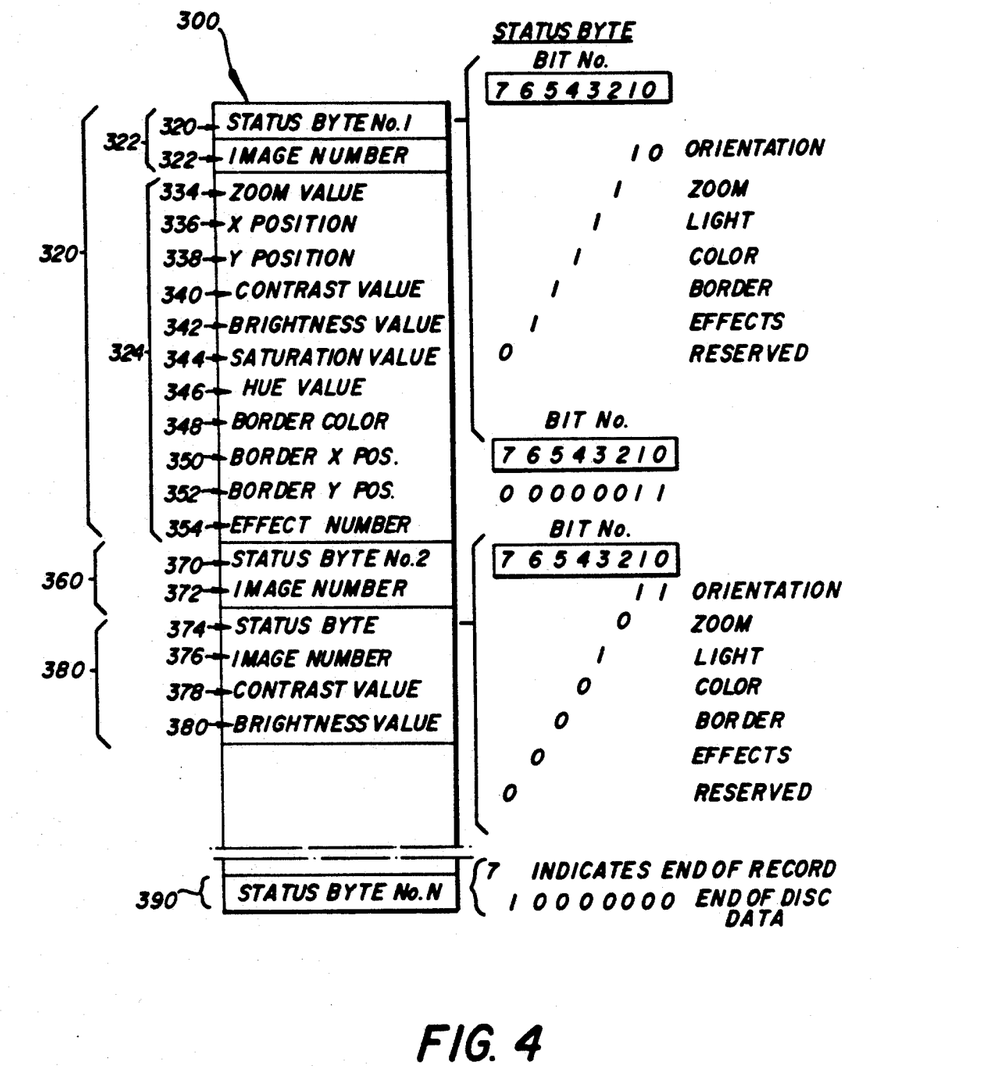
FIGS. 4 and 5 illustrates the organization of data in respective disc data files.

The data in each of the individual disc data files, for example disc #N data file 148, is organized in the manner shown in FIG. 4. The data file 300 is composed of a number of display records, for example display records 320, 360, and 380. Each display record, for example display record 320, is composed of two parts, a required part 322 including a status byte 330 and an image number byte 332, and an optional part 324 which depends on the value of status byte 330. The image byte 332 indicates which image data record on the disc should be used to create the image. This allows the images on the disc to be played back in any order, and further allows the same image to be displayed more than once, in two or more different altered forms, so that, for example, different parts of the same image can be viewed at differing magnifications.

The two LSBs (bit 0 and bit 1) of the status byte 330 are used to store the orientation of the image. The next 5 bits (bits 2-6) of status byte 330 indicate which, if any, optional features have been used to alter the image. In particular, bit 2=1 indicates that the zoom feature was used. When bit 2=1, three one byte parameter values are stored following the image number byte, the first byte 334 indicating the zoom value (magnification), the second byte 336 indicating the relative position of the left edge of the zoomed area in the x direction relative to the left edge of the original image, and the third byte 338 indicating the relative position of the top edge of the zoomed area in the y direction relative to the top edge of the original image. If, on the other hand, bit 2=0, the zoom feature was not used to alter the image, and the three one byte parameter values are not stored, thus reducing the memory required.

In a similar manner, bit 3=1 indicates that the contrast byte 340 and the brightness byte 342 are present, while bit 3=0 indicates that this feature was not used to alter the image. Color changes are indicated with bit 4=1 along with saturation byte 344 and hue value byte 346. Bit 5=1 indicates that the border feature was used, and that border color byte 348, border X position 350, and border Y position 352 are present. Bit 6=1 indicates that the effects feature was also used, and that the effects byte 354 will be present.

Note that for display record 370, on the other hand, none of the optional features was used to alter the appearance of the image, except perhaps the orientation feature. Status bits 2-7 all are set to 0, indicating that the image number stored in EEPROM address 372 should be displayed with the default settings for zoom, light, color, and border, and without special effects. For display record 380, only the 'lighten' 222 button was used to alter the appearance of the image, so that bit 3=1, and the contrast and brightness parameters are stored. Record 390, where bit 7=1, indicates that the end of disc data file 300 has been reached.

Figure 6:
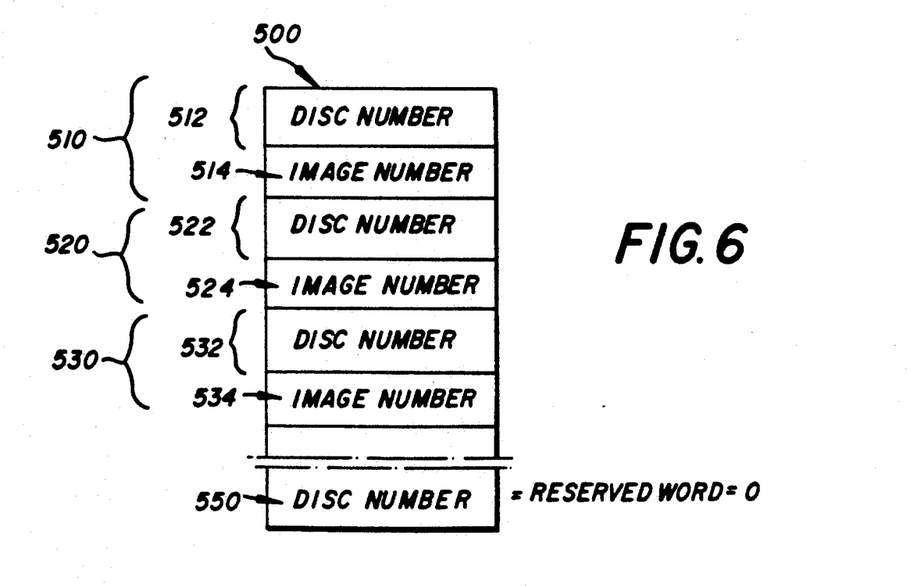
FIG. 6 shows a removable EEPROM module programmed to produce one ore more "album" image discs.

The removable EEPROM module 60 shown in FIG. 6 can also be programmed to order one or more reprints from a photofinisher equipped with the thermal printer 24 and CD player 20 (FIG. 1) which incorporates the memory module interface 58 of FIG. 2. The disc or discs containing the digitized images, together with EEPROM module 60, are delivered to the photofinisher, who can automatically generate the desired images in their desired form, by reading the reprint request data 160 (FIG. 3).

Figure 5:
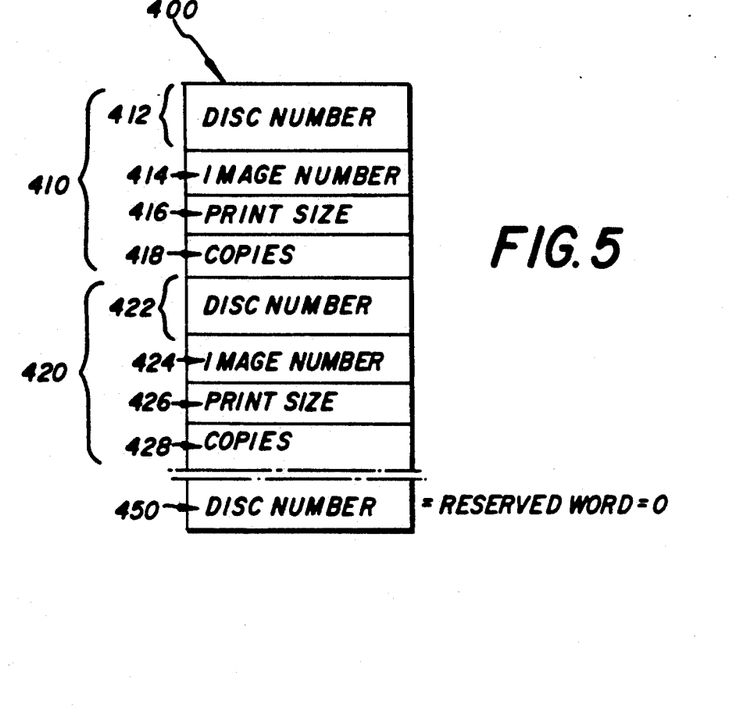

The organization of file 160 is shown in greater detail in FIG. 5. File 160 contains a number of print records, for example 410 and 420, each of which is composed of four values, a four byte disc number 412, a one byte image number 414, a one byte print size parameter 416, and a one byte copies value 418. The user programs the reprint request data file 400 by locating a desired image and pressing the reprint button 250 of remote control unit 200. The user next pushes up/down arrow button 216 to select the desired print size, enters the number of copies desired using buttons 204, and finally pushes the store button 230. After all the desired image prints have been selected and stored, the disc is ejected and the reprint request data is written from scratchpad RAM 45 to EEPROM module 60, followed by the "reserved word" disc number=0, indicating the end of the reprint request data. When the EEPROM module and discs are supplied to the photofinisher, the reprint request data file may be used to automatically determine the size and number of reprints, and the disc data file used to automatically select any optional features such as zoom, color balance, effects, etc., stored by the user.

The removable EEPROM module 60 in FIG. 6 can also be programmed to produce one or more "album" image discs from a photofinisher equipped with the CD recorder 16 and playback device 20 of FIG. 1, which incorporates a memory module interface 58 of FIG. 2. The disc or discs containing the digitized images, and the EEPROM module 60 are supplied to the photofinisher, who may automatically record the desired images in the desired order onto the new album disc, by reading the album disc data 180 in FIG. 3.

The organization of file 180 is also shown in greater detail in FIG. 6. File 180 file contains a number of album order records, for example 510, 520, and 530, each of which is composed of two values, a four byte disc number 512, and a one byte image number 514. The user programs the album disc data file 400 by locating the desired images, one at a time and in the desired order, and pressing the album button 260 followed by the store button 230 on remote control unit 200. When the EEPROM module and discs are given to the photofinisher, the album disc data file is used to automatically decide the order of transferred images, and the appropriate disc data files are also written into the master header file of the new album disc, where they may be used to automatically present the images on the album disc using the desired optional features such as zoom, color balance, effects, etc., originally stored by the user in the disc data files of the EEPROM module.

As will be appreciated from the foregoing description, the limited ability of an internal memory in a CD player to store user-generated image parameter data is augmented in accordance with the present invention by incorporating a storage medium, such as an electrically programmable read only memory module, configured to be removably interfaced with the CD player's microcontroller for storing image parameter data that has been (remotely) programmed by the user. The module can be then removed from the playback device and inserted into that or another playback device for controlling its operation. The customized image parameter data may include one or more image display parameters including contrast, image magnification, color balance, saturation, border type and border location. It may also store information from which a photofinisher may produce hard copy prints of selected images or an entirely new album disc of user selections taken from multiple discs. When creating a new album disc, the customized image parameter data may be recorded from the memory module into the master header file on the new discs, so that the EEPROM module containing the customized image parameter data does not need to be replicated.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a digital image processing system wherein a plurality of images are digitized and written to a first digital database, contents of said first digital database being readable by an image playback device which contains a digital database access controller for controllably accessing a digitized image stored by said first digital databases and, in response to the contents of a digitized image accessed from said first digital database, controllably outputting image display control signals for controlling the operation of an image display device, so that the image accessed from said first digital database is displayed thereby, a method of controlling the manner in which an image playback device causes said image display device to display an image comprising the steps of:

(a) storing, in said first digital database, in association with a respective one of digitized images written thereto, first control information through which said digital database access controller controls the accessing of a digitized image from said first digital database and outputs display device control signals, said first control information including a presentation control file which contains at least one of first data representative of the orientation of its associated image as stored by said first digital database and second data representative of the aspect ratio of its associated digitized image as stored by said first digital database;

(b) providing a second digital database which is configured to be coupled with said playback device and the contents of which are readable by and alterable by said controller;

(c) storing, in said second digital database, second control information for defining image display characteristics of one or more digitized images stored by said first digital database; and (d) causing said controller to access said first information stored by said first digital data base and second control information that has been stored by said second digital database and to control the display of an image stored by said first digital database in accordance with contents of said presentation control file and the contents of said second control information.

2. A method according to claim 1, wherein said second control information contains one or more image display parameters including contrast.

3. A method according to claim 1, wherein said second control information contains one or more image display parameters including brightness.

4. A method according to claim 1, wherein said second control information contains one or more image display parameters including image magnification.

5. A method according to claim 1, wherein said second control information contains one or more image display parameters including color hue.

6. A method according to claim 1, wherein said second control information contains one or more image display parameters including color saturation.

7. A method according to claim 1, wherein said second control information contains one or more image display parameters including border type and border location.

8. A method according to claim 1, wherein said second control information contains one or more image display parameters including orientation.

9. A method according to claim 1, wherein said second digital database comprises a non-volatile memory.

10. A method according to claim 1, wherein said second control information includes a parameter representative of a modification of said first control information stored in said presentation control file in step (a).

11. For use with a digital image processing system wherein a plurality of images are digitized and written to a first digital database, contents of said first digital database being readable by an image playback device, which contains a digital database access controller for controllably accessing a digitized image stored by said first digital database and, in response to the contents of a digitized image accessed from said first digital database, controllably outputting image display control signals for controlling the operation of an image display device, so that an image accessed from said first digital database is displayed thereby, a method of controlling the manner in which an image playback device causes said image display device to display an image comprising the steps of:

(a) storing, in said first digital database, in association with a respective one of digitized images written thereto, first control information through which said digital database access controller controls the accessing of a digitized image from said first digital database and outputs display device control signals, said first control information including a presentation control file which contains at least one of first data representative of the orientation of its associated image as stored by said first digital database and second data representative of the aspect ratio of its associated digitized image as stored by said first digital database;

(b) inputting to said controller said first information stored by said first digital data base and second control information for defining image display characteristics of one or more digitized images stored by said first digital database, so as to cause said controller to control the display of an image stored by said first digital database in accordance with contents of said presentation control file and said second control information;

(c) providing a second digital database which is configured to be removably coupled with said playback device and the contents of which are readable by and alterable by said controller; and (d) storing, in said second digital database, said second control information, so that said second digital database, upon being removed from said playback device, will contain said second control information for controlling the operation of an image playback device.

12. A method according to claim 11, wherein said second control information contains one or more image display parameters including contrast.

13. A method according to claim 11, wherein said second control information contains one or more image display parameters including brightness.

14. A method according to claim 11, wherein said second control information contains one or more image display parameters including image magnification.

15. A method according to claim 11, wherein said second control information contains one or more image display parameters including color hue.

16. A method according to claim 11, wherein said second control information contains one or more image display parameters including color saturation.

17. A method according to claim 11 wherein said second control information contains one or more image display parameters including border type and border location.

18. A method according to claim 11, wherein said second control information contains one or more image display parameters including orientation.

19. A method according to claim 11, wherein said second digital database comprises a non-volatile memory.

20. A method according to claim 11, wherein said second control information includes a parameter representative of a modification of said first control information stored in said presentation control file in step (a).

21. For use with a digital image processing system wherein a plurality of images are digitized and written to a first digital database, contents of said first digital database being readable by an image playback device, which contains a digital database access controller for controllably accessing a digitized image stored by said first digital database and, in response to the contents of a digitized image accessed from said first digital database, controllably outputting image display control signals for controlling the operation of an image reproduction device, so that image accessed from said first digital database is reproduced thereby, a method of controlling the manner in which an image playback device causes said image reproduction device to reproduce an image comprising the steps of:

(a) storing, in said first digital database, in association with a respective one of digitized images written thereto, first control information through which said digital database access controller controls the accessing of a digitized image from said first digital database and outputs reproduction device control signals, said first control information including a presentation control file which contains at least one of first data representative of the orientation of its associated image as stored by said first digital database and second data representative of the aspect ratio of its associated digitized image as stored by said first digital database;

(b) inputting to said digital database access controller said first information stored by said first digital data base and second control information for defining image reproduction characteristics of one or more digitized images stored by said first digital database, so as to cause said controller to control the reproduction of an image stored on said first digital database in accordance with contents of said presentation control file and said second control information;

(c) providing a second digital database, which is configured to be removably engageable with said playback device and the contents of which are readable by and alterable by said controller; and (d) storing, in said second digital database, said second control information, so that said second digital database, upon being removed from said image playback device, will contain said second control information for controlling the operation of an image playback device.

22. A method according to claim 21, wherein said second control information contains one or more image display parameters including contrast.

23. A method according to claim 21, wherein said second control information contains one or more image display parameters including brightness.

24. A method according to claim 21, wherein said second control information contains one or more image display parameters including image magnification.

25. A method according to claim 21, wherein said second control information contains one or more image display parameters including color hue.

26. A method according to claim 21, wherein said second control information contains one or more image display parameters including color saturation.

27. A method according to claim 21, wherein said second control information contains one or more image display parameters including border type and border location.

28. A method according to claim 21, wherein said second control information contains one or more image display parameters including orientation.

29. A method according to claim 21, wherein said second digital database comprises a non-volatile memory.

30. A method according to claim 21, wherein said reproduction device comprises an image display device.

31. A method according to claim 21, wherein said second control information includes a parameter representative of a modification of said first control information stored in said presentation control file in step (a).

32. A method according to claim 21, wherein said reproduction device comprises an image printer.

33. A method according to claim 32, wherein said second control information contains one or more image print parameters including contrast.

34. A method according to claim 32, wherein said second control information contains one or more image print parameters including brightness.

35. A method according to claim 32, wherein said second control information contains one or more image print parameters including image magnification.

36. A method according to claim 32, wherein said second control information contains one or more image print parameters including color hue.

37. A method according to claim 32, wherein said second control information contains one or more image print parameters including color saturation.

38. A method according to claim 32, wherein said second control information contains one or more image print parameters including border type and border location.

39. A method according to claim 32, wherein said second control information contains one or more image print parameters including orientation.

40. A method according to claim 32, wherein said second control information contains one or more image print parameters including number of prints.

41. A method according to claim 32, wherein said second control information contains one or more image print parameters including size of print.

42. For use with a digital image processing system wherein a plurality of images are digitized and written to a plurality of first digital databases, contents of each first digital database being readable by an image playback device, which contains a digital database access controller for controllably accessing a digitized image stored by a first digital database and, in response to the contents of a digitized image accessed from a first digital database, controllably outputting image display control signals for controlling the operation of an image reproduction device, so that image accessed from a first digital database is reproduced thereby, a method of controlling the manner in which said image playback device causes said image reproduction device to reproduce an image comprising the steps of:

(a) storing, in said first digital database, in association with a respective one of digitized images written thereto, first control information through which said digital database access controller controls the accessing of a digitized image from a first digital database and outputs reproduction device control signals, said first control information including a presentation control file which contains at least one of first data representative of the orientation of its associated image as stored by said first digital database and second data representative of the aspect ratio of its associated digitized image as stored by said first digital database;

(b) inputting to said digital database access controller said first information stored by said first digital data base and second control information for defining image reproduction characteristics of one or more digitized images stored by one or more first digital databases, so as to cause said controller to control the reproduction of an image stored by a first digital database in accordance with contents of said presentation control file and said second control information;

(c) providing a second digital database, which is configured to be removably engageable with said playback device and the contents of which are readable by and alterable by said controller; and (d) storing, in said second digital database, in association with said one or more digitized images, second control information, so that said second digital database, upon being removed from said image playback device, will contain, second control information for controlling the reproduction of said one or more digitized images by an image playback device.

43. A method according to claim 42, wherein said second control information contains one or more image print parameters including contrast.

44. A method according to claim 42, wherein said second control information contains one or more image print parameters including brightness.

45. A method according to claim 42, wherein said second control information contains one or more image print parameters including image magnification.

46. A method according to claim 42, wherein said second control information contains one or more image display parameters including color hue.

47. A method according to claim 42, wherein said second control information contains one or more image display parameters including color saturation.

48. A method according to claim 42, wherein said second control information contains one or more image display parameters including border type and border location.

49. A method according to claim 42, wherein said second control information contains one or more image display parameters including orientation.

50. A method according to claim 42, wherein said first digital databases comprises an optical compact disc.

51. A method according to claim 42, wherein said reproduction device comprises an image display device.

52. A method according to claim 42, wherein said reproduction device comprises an image printer.

53. A method according to claim 42, wherein said second control information includes a parameter representative of a modification of said first control information stored in said presentation control file in step (a).

54. A digitized image playback apparatus for use with a digital image processing system wherein a plurality of images are digitized and written to a first digital database, said first digital database storing, in association with a respective one of digitized images written thereto, first control information through which a digital database access controller controls the accessing of a digitized image from said first digital database and outputs reproduction device control signals, said first control information including a presentation control file which contains at least one of first data representative of the orientation of its associated image as stored by said first digital database and second data representative of the aspect ratio of its associated digitized image as stored by said first digital database, and being coupled to an image playback apparatus, for the control of the operation of said image display device comprising, in combination:

a digital database access controller which controllably accesses a digitized image and said first control information stored by said first digital database medium and, in response to the contents of a digitized image and said presentation control file accessed from said first digital database, controllably outputs image display control signals for controlling the operation of said image display device, so that a digitized image accessed from said first digital database is displayed thereby;

a memory which stores said first control information through which said digital database access controller controls the accessing of a digitized image from said first digital database and outputs display device control signals;

an input device for supplying to said digital database access controller second control information for defining image display characteristics of one or more digitized images stored by said first digital database, so as to cause said controller to control the display of a digitized image stored by said first digital database in accordance with said first and second control information;

a second digital database, which is configured to be removably engageable with said playback device and the contents of which are readable by and alterable by said digital database access controller; and interface means, coupled with said controller, for storing, in said second digital database, said second control information, so that said second digital database, upon being removed from said playback device, will contain said second control information for controlling the operation of an image playback device.

55. A digitized image playback apparatus according to claim 54, wherein said second control information contains one or more image display parameters including contrast.

56. A digitized image playback apparatus according to claim 54, wherein said second control information contains one or more image display parameters including brightness.

57. A digitized image playback apparatus according to claim 54, wherein said second control information contains one or more image display parameters including image magnification.

58. A digitized image playback apparatus according to claim 54, wherein said second control information contains one or more image display parameters including color hue.

59. A digitized image playback apparatus according to claim 54, wherein said second control information contains one or more image display parameters including color saturation.

60. A digitized image playback apparatus according to claim 54, wherein said second control information contains one or more image display parameters including border type and border location.

61. A digitized image playback apparatus according to claim 54, wherein said second control information contains one or more image display parameters including orientation.

62. A digitized image playback apparatus according to claim 54, wherein said second control information contains one or more image display parameters including a non-volatile memory.

63. A digitized image playback apparatus according to claim 54, wherein said second control information includes a parameter representative of a modification of said first control information.

64. A digitized image playback apparatus for use with a digital image processing system wherein a plurality of color images are digitized and corresponding digitized image files are stored on an optical compact disc, a respective digitized image file including, in association with a respective digitized image, first control information for controlling accessing of a digitized image from said optical compact disc, said first control information including a presentation control file which contains at least one of first data representative of the orientation of its associated image as stored by said optical compact disc and second data representative of the aspect ratio of its associated digitized image as stored by said optical compact disc, comprising, in combination:

an optical compact disc player which is configured to receive said optical compact disc and controllably read image data including said first control information that has been stored thereon, said optical compact disc player including a disc access controller which controllably accesses to a digitized image stored by said disc and, in response to said first control information accessed from said disc, controllably accesses an image file stored thereon and outputs image reproduction control signals for controlling an operation of an image reproduction device, so that a digitized still color image accessed from said optical compact disc is reproduced thereby, said optical compact disc player further including input means for supplying to said disc access controller second control information for defining image reproduction characteristics of one or more digitized images stored on said optical compact disc;

a transportable digital data storage medium, which is configured to be removably engageable with said optical compact disc player, and contents of which are readable by and alterable by said controller; and interface means, coupled with said disc access controller, for storing, in said transportable digital data storage medium, said second control information, so that said transportable digital storage medium, upon being removed from said playback device, will contain said second control information for controlling the operation of an image reproduction device.

65. A digitized image playback apparatus according to claim 64, wherein said second control information contains one or more image display parameters including contrast.

66. A digitized image playback apparatus according to claim 64, wherein said second control information contains one or more image display parameters including brightness.

67. A digitized image playback apparatus according to claim 64, wherein said second control information contains one or more image display parameters including image magnification.

68. A digitized image playback apparatus according to claim 64, wherein said second control information contains one or more image display parameters including color hue.

69. A digitized image playback apparatus according to claim 64, wherein said second control information contains one or more image display parameters including color saturation.

70. A digitized image playback apparatus according to claim 64, wherein said second control information contains one or more image display parameters including border type and border location.

71. A digitized image playback apparatus according to claim 64, wherein said second control information contains one or more image display parameters including orientation.

72. A digitized image playback apparatus according to claim 64, wherein said transportable digital data storage medium comprises an electrically erasable programmable read only memory.

73. A digitized image playback apparatus according to claim 64, wherein said reproduction device comprises an image display device.

74. A digitized image playback apparatus according to claim 64, wherein said second control information includes a parameter representative of a modification of said first control information.

75. A digitized image playback apparatus according to claim 64, wherein said reproduction device comprises an image printer.

76. A digitized image playback apparatus according to claim 65, wherein said second control information contains one or more image print parameters including contrast.

77. A digitized image playback apparatus according to claim 75, wherein said second control information contains one or more image print parameters including brightness.

78. A digitized image playback apparatus according to claim 75, wherein said second control information contains one or more image print parameters including image magnification.

79. A digitized image playback apparatus according to claim 75, wherein said second control information contains one or more image print parameters including color hue.

80. A digitized image playback apparatus according to claim 75, wherein said second control information contains one or more image print parameters including color saturation.

81. A digitized image playback apparatus according to claim 75, wherein said second control information contains one or more image print parameters including border type and border location.

82. A digitized image playback apparatus according to claim 75, wherein said second control information contains one or more image print parameters including orientation.

83. A digitized image playback apparatus according to claim 75, wherein said second control information contains one or more image print parameters including number of prints.

84. A digitized image playback apparatus according to claim 75, wherein said second control information contains one or more image print parameters including size of print.

* * * * *